UNITED STATES PATENT OFFICE.

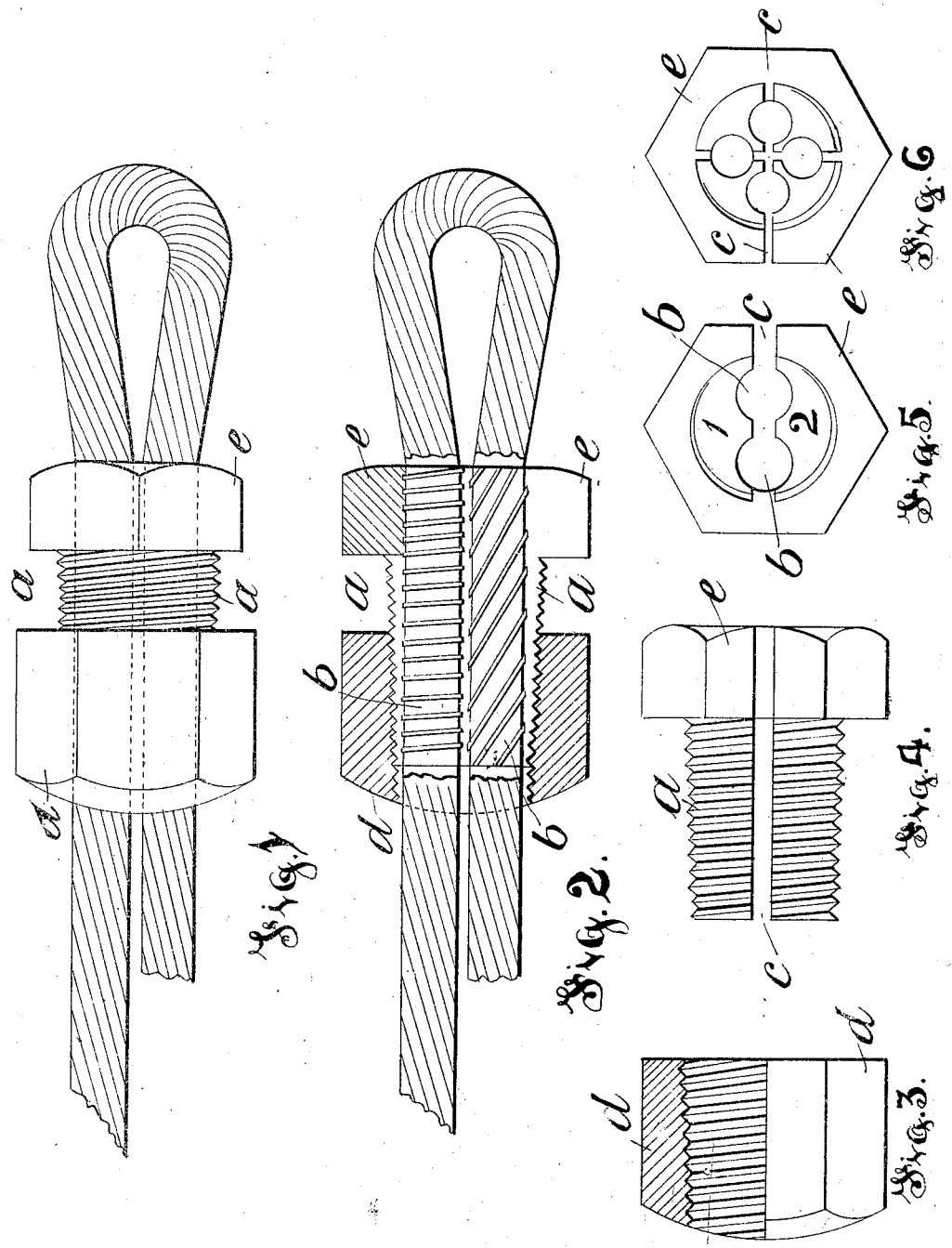

JAMES MOSS, OF MANCHESTER, ENGLAND.

MEANS FOR GRIPPING AND COUPLING WIRE ROPES, RODS, &c.

No. 874,417.  Specification of Letters Patent.  Patented Dec. 24, 1907.

Application filed March 25, 1904. Serial No. 200,064.

*To all whom it may concern:*

Be it known that I, JAMES MOSS, a subject of the King of Great Britain and Ireland, and resident of Manchester, England, have invented certain new and useful Improvements in Means for Gripping and Coupling Wire Ropes, Rods, and the Like, of which the following is a specification:

This invention refers to and consists of improvements in means for quickly and effectively gripping and coupling wire ropes, rods and the like, and particularly wire ropes and rods (or the parts thereof) lying alongside and parallel with each other, and its object is to dispense with the slow and unsatisfactory method of effecting the connection by wire lashings as heretofore, as well as to prevent the waste of the rope and wire in forming such connections.

According to the invention I employ a metal sleeve, yoke, or clamp slightly tapered on its exterior, and wide enough to allow two or more ropes to pass through it. Such sleeve I split (or slit) in part longitudinally and upon its interior faces I form channels or grooves corresponding in diameter to the size of rope or ropes to be gripped. The tapered exterior of the clamp is screw-threaded to receive a nut, so that when tightened up the nut serves to contract the sleeve and cause it to grip the ropes.

In order that my invention shall be clearly understood I have hereunto appended a sheet of drawings, wherein Figure 1 illustrates an exterior elevation of the complete coupling and such view also shows one of its chief uses i. e., as a substitute for lashings in producing a loop at the end of a wire rope as largely used in telegraph and like work. Fig. 2 illustrates a longitudinal section with parts of the rope removed in order to show the interior roughening of the grooves. Figs. 3, 4 and 5 illustrate the two main parts of the coupling separately, Fig. 3 being partly in section and Fig. 5 being an end view of Fig. 4. Fig. 6 illustrates an end view of another form of the improved coupling.

Referring to Figs. 1 to 5, (*a*) is the aforesaid sleeve or clamp part with screw-threaded and tapered or conical exterior. In such part are the borings (*b*), (*b*). Passing completely through the sleeve, except for a small portion at the wider end, and through the plane of the borings is a saw cut or slit (*c*) producing segmental jaws (1), (2), see Fig. 5. (*d*) is the tightening nut, which is, by preference, slightly conical upon its interior in keeping with the taper of the sleeve (*a*), see Figs. 2 and 3. Upon the larger end the sleeve is a flange (*e*) with holes for a "tommy" or of hexagonal shape for a spanner.

When assembled and in use the several parts occupy the positions shown in Fig. 1, the wire rope by being turned back on itself forming the loop, and the coupling by firmly gripping the two parts offering a firm resistance to the loop coming loose.

Obviously, instead of gripping two parts of the same rope the coupling may grip two separate ropes, or a rope and a rod, the main purpose of my invention being to hold by the same clamp two or more objects, or two or more parts of an object lying side by side.

For coupling three or more ropes I form the coupling with borings to suit, and to provide the necessary grip with each I slit the sleeve through each boring.

In Fig. 6 I show how the block is formed for clamping two looped ropes four separate ropes, or one looped rope and two separate ropes, the extra slit (*c*) extending only to the flange (*e*).

To increase the grip I may groove, serrate or "rifle" the interior faces of the borings as shown in Fig. 2, the grooving being either in the form of single screw threads or to the pattern of the rope.

What I claim is:—

For gripping two lashings or the like side by side and by one adjustment, the combination of a conical metal block with its exterior of conical formation and screw threaded, and also having a nut-like boss at one end, and said block formed with borings extending from end to end of the block and also grooved internally and said block also slit longitudinally in part and a nut with tapered and screw-threaded interior for contracting the block simultaneously upon the two lashings passing through the borings, as set forth.

In witness whereof I have hereunto set my hand in the presence of two witnesses.

JAMES MOSS.

Witnesses:
 JOHN WILLIAM THOMAS,
 WALTER GUNN.